United States Patent [19]

Henzlik

[11] Patent Number: 4,957,623

[45] Date of Patent: Sep. 18, 1990

[54] AQUARIUM CLEANING SYSTEM USING MOVABLE UNDERGRAVEL SUCTION HEAD

[76] Inventor: Joseph C. Henzlik, 730 Judson Ave. #16, Highland Park, Ill. 60035

[21] Appl. No.: 474,515

[22] Filed: Feb. 2, 1990

[51] Int. Cl.⁵ .................. B01D 27/00; B01D 29/01; A01K 63/04

[52] U.S. Cl. .................. 210/169; 210/407; 210/416.2; 15/1.7; 119/5

[58] Field of Search .................. 210/169, 416.2, 391, 210/407; 119/5; 15/1.7

[56] References Cited

U.S. PATENT DOCUMENTS

| | | | |
|---|---|---|---|
| 3,630,364 | 12/1971 | Johnston | 210/169 |
| 3,722,685 | 3/1973 | Orensten et al. | 210/169 |
| 3,734,853 | 5/1973 | Horvath | 210/169 |
| 3,803,658 | 4/1974 | Raubenheimer | 15/1.7 |
| 3,826,371 | 7/1974 | Adamson | 210/169 |
| 3,949,442 | 4/1976 | Chandler | 15/1.7 |
| 4,233,702 | 11/1980 | Zweifel | 15/1.7 |
| 4,351,077 | 9/1982 | Hofmann | 15/1.7 |
| 4,365,375 | 12/1982 | Grodin et al. | 15/1.7 |
| 4,913,811 | 4/1990 | Huang et al. | 210/169 |

Primary Examiner—W. Gary Jones
Assistant Examiner—R. Simpson
Attorney, Agent, or Firm—McCaleb, Lucas & Brugman

[57] ABSTRACT

An aquarium cleaning system comprises undergravel cleaning apparatus and a fish tank having a bottom wall and side and end walls. The cleaning apparatus in the example illustrated comprises a rectangular frame having side and end walls sized to fit within the bottom portion of the tank. An apertured gravel-supporting floor plate is mounted on the top of the frame and defines a space within the frame beneath the plate. A stationary guide tube extends upwardly from the frame above the floor plate. A movable suction head is located within the space and is connected to a movable siphon tube extending upwardly through the guide tube. An upstanding aeration tube is mounted on the floor plate and has a coaxial air supply tube which supports an apertured wiper disc and an apertured filter cartridge, both having wiper elements engaged with the inside wall of the aeration tube to remove algae and detritus. The floor plate comprises two grid sections with parallel slits. The lower section is movable to vary the degree of registration of the slits between fully opened and fully closed modes for special purposes which are described. This invention is disclosed by way of illustration and not by way of limitation for use with an indoor aquarium or tank. It may be applied equally to outdoor aquariums, tanks and ponds without limitation as to size.

24 Claims, 3 Drawing Sheets

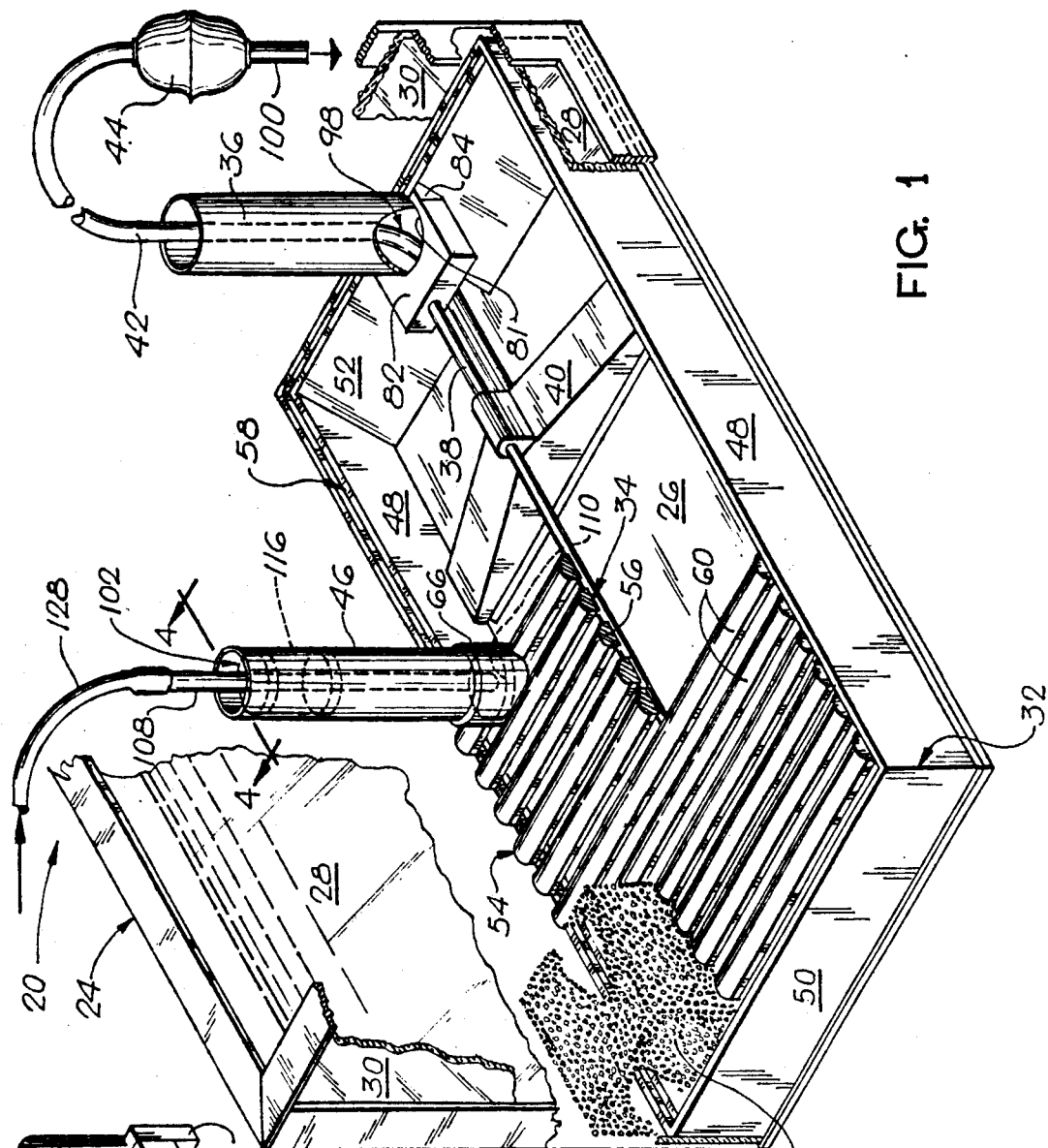
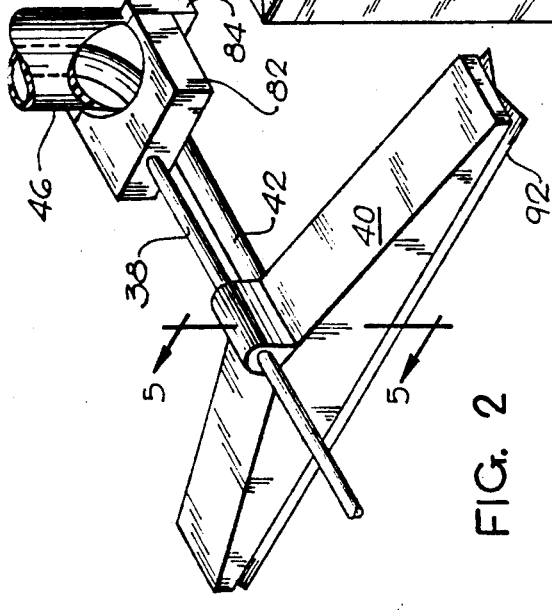
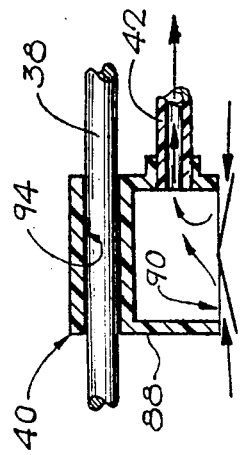
FIG. 1
FIG. 2
FIG. 5

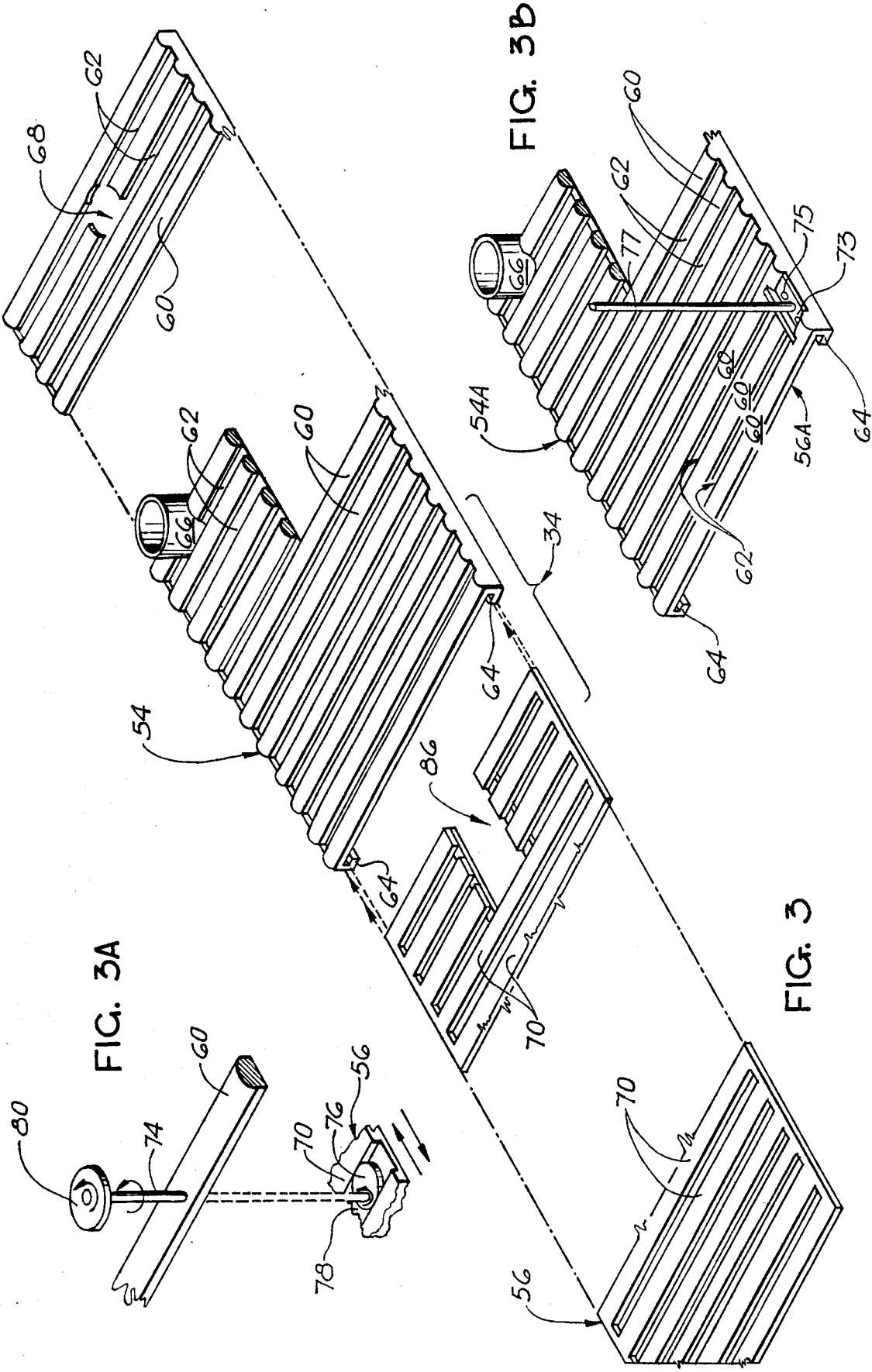

AQUARIUM CLEANING SYSTEM USING MOVABLE UNDERGRAVEL SUCTION HEAD

BACKGROUND OF THE INVENTION

A problem faced by aquarists who rely on traditional undergravel filters in the bottoms of their aquariums is that the gravel traps and accumulates fecal and vegetable matter, algae, unconsumed food, and various other kinds of detritus. The only way to clean this type of filter is to break down the entire aquarium by uprooting the filter, disconnecting all electrical leads and air tubes, and removing the entire contents of the aquarium, including all fish, plants, ornaments, etc. This is labor-intensive and time-consuming, not to mention the time, effort and skill required to restore the aquarium to its original condition with a completely new water charge having a balanced pH and ideal temperature.

Removing fish from their "home" for cleaning in this manner is very stressful and is a cause for loss in many cases, especially where proper procedures are not followed because of lack of knowledge on the part of the hobbyist, or taking shortcuts to save time or effort.

BRIEF SUMMARY OF THE INVENTION

A general object of the present invention is to provide an improved aquarium cleaning system in which the gravel base can be cleaned without removing or otherwise disturbing the fish in any way. A specific object is to provide an apertured gravel-supporting floor plate above the aquarium bottom wall to provide a space below the floor plate from which fecal matter and detritus falling through the gravel and floor plate can be removed without disturbing the fish above the gravel bed.

Another object is to provide a suction head within the space beneath the floor plate and connect it to a siphon tube for movement back and forth to withdraw contaminants which have sifted down through the gravel bed and accumulated in the space below.

Another object is to provide an improved floor plate with adjustable apertures to support the gravel bed above the tank bottom, the floor plate comprising a pair of grid sections with parallel slits and the two grid sections being relatively slidably engaged to vary the degree of registration of the slits.

Another object is to provide an improved floor plate with adjustable apertures that can be adjusted to a closed position enabling the gravel bed to be used as a spawning medium for egg-laying fish, and to an opened position enabling spawn to be withdrawn through a suction head in the space beneath the floor plate.

Another object is to provide an improved self-cleaning aeration tube upstanding from the floor plate with a coaxial air supply tube which supports an apertured wiper disc and an apertured filter cartridge, both having wiper elements engaging the inside wall of the aeration tube for removing algae and detritus from the inner wall of the aeration tube when the wiper disc and filter cartridge are withdrawn with the air supply tube.

BRIEF DESCRIPTION OF THE DRAWING

Other objects and advantages will be apparent from the following description and the accompanying drawing in which:

FIG. 1 is a fragmentary isometric view of an aquarium cleaning system illustrating a preferred form of the present invention;

FIG. 2 is a portion of FIG. 1 showing a subassembly consisting of a suction head, siphon tube, and a vertical guide tube for the latter;

FIG. 3 is an exploded, isometric view of a slatted floor plate which supports an elevated gravel bed;

FIG. 3A is a fragmentary, enlarged view of an optional embodiment for varying the aperture size in the floor plate;

FIG. 3B shows another option for manually varying the aperture size in the floor plate;

FIG. 5 is an enlarged, central, vertical cross sectional view of the suction head taken on line 5—5 of FIG. 2.

Like parts are referred to by like reference numerals throughout the figures of the drawing.

DESCRIPTION OF THE PREFERRED EMBODIMENT

Figure 4:
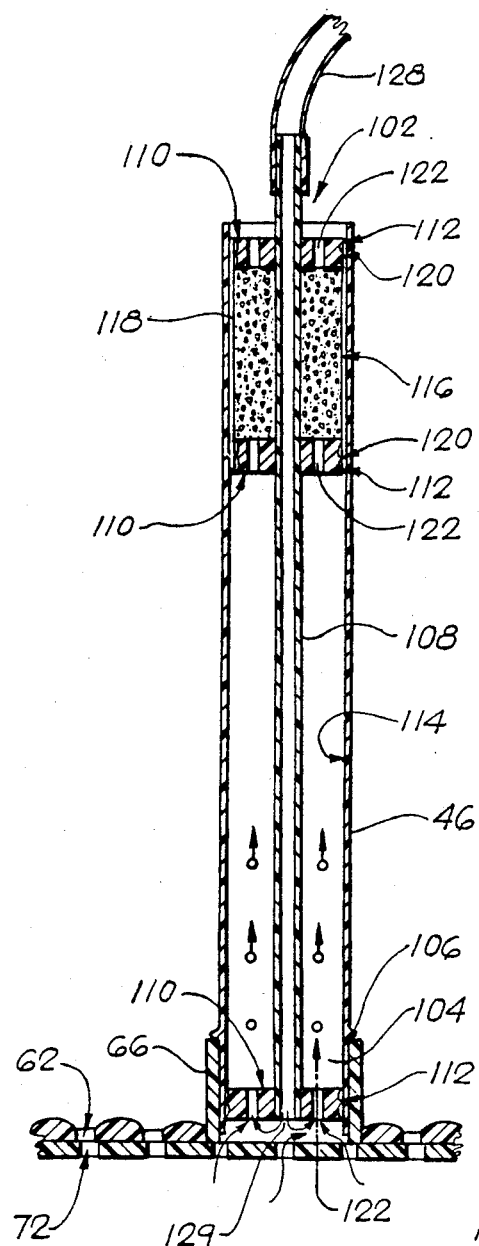
FIG. 4 is a fragmentary enlarged cross sectional view of FIG. 1 taken on line 4—4.

Referring now to the preferred form of the present invention shown in the drawings, the improved aquarium cleaning system is generally designated 20 and comprises undergravel aquarium cleaning apparatus 22 in an aquarium or fish tank 24.

The aquarium tank 24 is conventional, having a bottom wall 26, side walls 28,28, and end walls 30,30.

Figure 6:
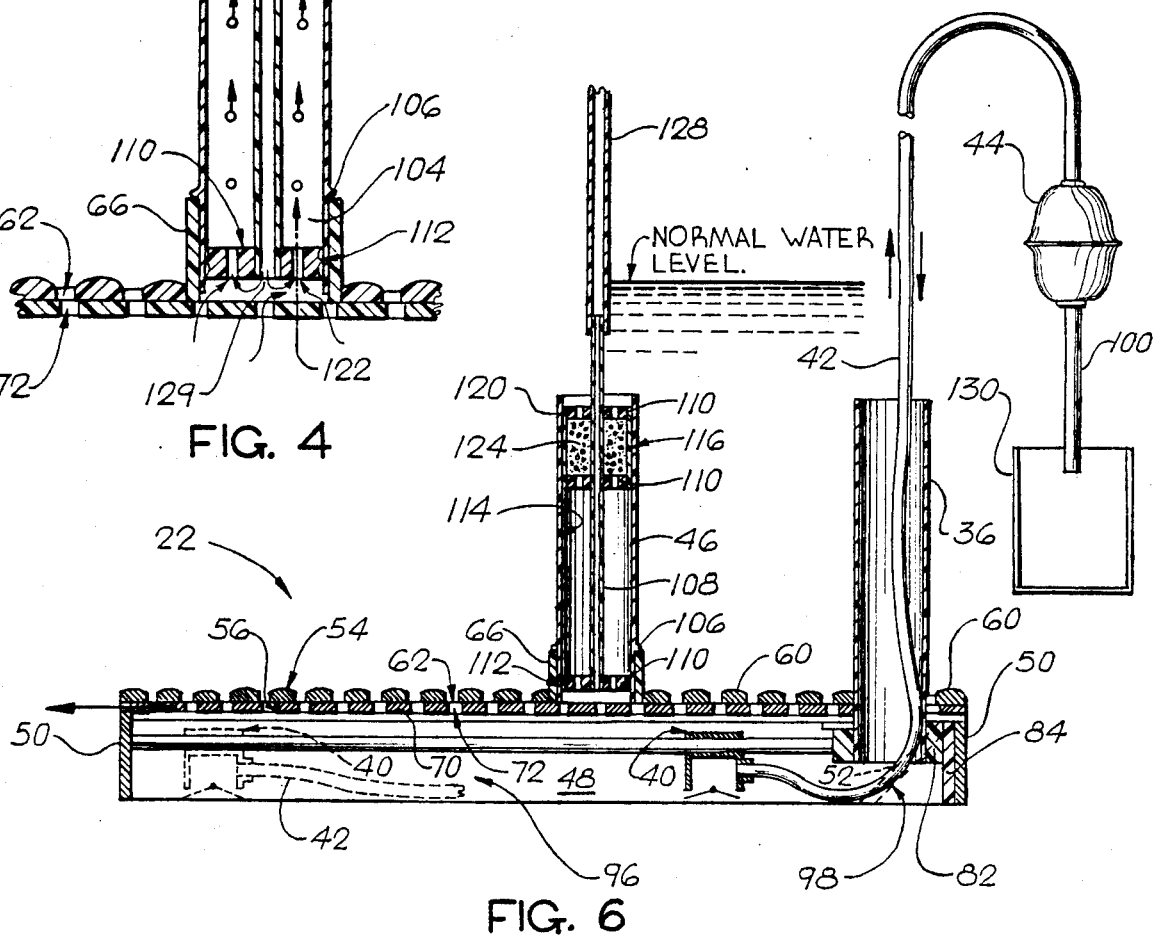
FIG. 6 is a vertical cross sectional view of the assembly shown in FIG. 1, with the external tank parts and gravel omitted for clarity.

As best shown in FIGS. 1 and 6, the undergravel aquarium cleaning apparatus 22 comprises: a rectangular frame 32; an apertured floor plate 34; a first guide means comprising an upstanding guide tube 36; a second guide means comprising of a horizontal rod 38; a suction head 40; a siphon tube 42; a siphon bulb 44; and an aeration tube 46.

The rectangular frame 32 is sized preferably to fit snugly within the lower portion of aquarium tank 24. It has side walls 48,48, end walls 50,50, but no bottom or top wall. An additional, inner end wall 52 is provided at one end, inclined at an angle of about 45 degrees for improved clean-up as will be described.

The apertured floor plate 34 has a plurality of apertures which are adjustable. In the embodiment shown, the floor plate consists of a pair of upper and lower sections 54 and 56 respectively, each having slitted apertures therein. The lower plate section is movable relative to the upper section to vary the degree of registration of the apertures in the respective plates.

In particular, the upper plate section 54 is a slatted grid section which is seated in an upper, peripheral recess 58 formed in the top of the frame 32. It has a plurality of spaced, parallel, upper slats 60, with rounded upper surfaces, defining a plurality of spaced, parallel, slitted apertures 62 therebetween. Inturned lower horizontal flanges 64 are provided on the underside of the upper grid section 54 and extend in spaced parallel relation to the slatted upper grid section. A cylindrical collar 66 is secured as by adhesive or by integral molding with the upper surface to support the aeration tube 46 as will be described. In addition, there is a circular opening 68 (FIG. 3) providing clearance for the guide tube 36 to extend through the upper plate grid section 54. The guide tube may or may not be fixed, as by adhesive, to the upper plate grid section.

The lower plate grid section 56 has a plurality of spaced parallel lower slats 70 defining a plurality of spaced parallel slitted apertures 72 therebetween. The lower plate grid section 56 is slidably inserted in the upper plate grid section 54 and supported on flanges 64,64 for relative movement to vary the degree of registration between the slitted apertures 62 and 72 from a fully open, fully registered position shown in FIG. 4 to a fully closed position shown in FIG. 4A.

FIG. 3A shows an optional mechanism for moving the lower section 56 to change the size of the apertures between the upper and lower slats 60 and 70 respectively. A vertical shaft 74 is rotatably journaled in one of the upper slats 60 and has an eccentric cam 76 at its lower end seated in a slot 78 formed in the upper surface of a corresponding lower slat 70. An adjusting hand wheel 80 is secured to the top end of shaft 74 and may be located above or below the water level as desired. Rotation of the cam 76 by hand wheel 80 moves the lower plate grid section 56 in the direction of the arrows shown in FIG. 3A, between a fully opened position corresponding to FIG. 4 and a fully closed position corresponding to FIG. 4A.

Referring to the further option for varying the aperture size, FIG. 3B shows a modified plate assembly in which a lower plate grid section 56A is slidably mounted on the underside of upper plate grid section 54A. Plate sections 54A and 56A are identical to plate sections 54 and 56 except that plate section 54A has an opening 71 through which a small edge portion 73 of plate section 56A is accessible. A plurality of vertical bores 75 are formed in portion 73. A vertical rod 77 may be inserted in one of the openings 75 enabling the owner to move the plate section 56A to vary the aperture size. Rod 77 may be permanently secured to section 56A, or it may be removable and replaceable for use as needed.

Guide tube 36 passes through opening 68 in the upper plate grid section 54, being held in place by a suitable adhesive in an opening 81 in a block 82 which is fastened to a vertical block 84 behind the inclined inner end wall 52. Block 84 is secured to the adjacent end wall 50 as best shown in FIG. 6.

The lower plate grid section 56 is provided with an open-ended slot 86 to clear the guide tube 36 when assembled as shown in FIG. 6.

The horizontal rod 38 is secured between block 82 and the opposite end wall 50 as shown in FIGS. 1 and 6.

The suction head 40 consists of a hollow housing 88 substantially the width of the frame between side walls 48,48. It has a bottom opening 90 partially closed by an inverted V-shaped fluid guide car louver 92. It has an upper horizontal bore 94 through which the rod 38 is journaled to guide the suction head for straight-line movement in the space 96 beneath the floor plate 34. The suction head is movable along the rod as indicated in the solid line and broken line positions shown in FIG. 6.

The siphon tube 42 is connected to the suction head 40 and extends to the outside of the tank, passing upwardly through guide tube 36. The siphon tube is of a suitable plastic material such as polyethylene or polyvinyl chloride so it will bend as shown at 98 as shown in FIGS. 1 and 6 but is sufficiently stiff to enable the suction head to be moved leftwise to the position shown in broken lines in FIG. 6 by simply pushing the siphon tube 42 downwardly into guide tube 36. Conversely, the suction head 40 can be pulled to the right, to the solid line position shown in FIG. 6, and beyond, to the inclined end plate 52, by simply pulling the siphon tube 42 upwardly in the guide tube 36.

The siphon bulb 44 may be of conventional rubber-like construction and is attached to the outer end of siphon tube 36. To use it as a siphon, it will be placed outside the tank at a level substantially below the water level in the tank, and positioned to discharge into a bucket or other suitable drain. By squeezing the bulb, then allowing it to expand while the outlet tube 100 is closed by an operator's forefinger, water will be drawn out of the space 96 into the siphon bulb to start the siphon action.

Figure 4A:
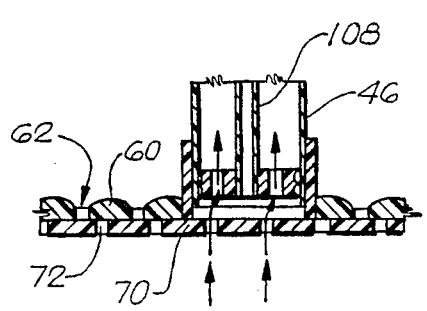
FIG. 4A is a fragmentary view similar to FIG. 4 showing the floor plate in closed position.

As best shown in FIGS. 4 and 4A, the aeration tube 46 has an upwardly open end portion 102 and a lower portion 104 removably inserted in the collar 66. An external bead 106 limits downward displacement of the tube 46 and prevents interference with the relatively movable lower floor plate grid section 56. An air supply tube 108 extends concentrically downwardly through the upper open end, coaxially within the aeration tube 46, and carries an apertured wiper disc 110 at its lower end. The wiper disc has a circumferential wiping edge 112 engageable with the inner wall 114 of tube 46. Up and down movement of the apertured wiper disc 110 with the air supply tube 108 effectively clears the inner surface 114 to remove algae and detritus which otherwise would not be accessible without removing the aeration tube from the aquarium tank and cleaning it with a long narrow brush.

A cylindrical filter cartridge 116 is carried by the air supply tube 108 in the upper portion of the aeration tube 46. The cartridge comprises a cylindrical body section 118 sized to fit snugly but slidably within tube 46. It has a pair of apertured wiper discs 110,110 at opposite ends, each with an external, cylindrical bead 120 in frictional sealing engagement with the inner surface of the cylindrical body section 118. Each disc is frictionally engaged with the central air supply tube 108 and movable up and down with it. The discs 110 may be identical for economy in manufacture. Each is shown with fluid passages 122. A filter medium 124, such as activated charcoal, is retained within the cartridge.

It is believed that use and operation will be apparent in view of the above description. Briefly, however, in normal aquarium use, a layer of gravel 126 will be spread on the floor plate upper section 54 as shown in FIG. 1. The lower floor plate section 56 will be shifted to register the slitted apertures 62,72 as best shown in FIG. 4. This will allow fecal and vegetable matter and other detritus to pass downwardly through the coarse gravel into the space 96, without allowing gravel to drop through the slitted openings. Typically, the opened width of the slits may be in the order of one-sixteenth of an inch depending on the grain size of the gravel. Larger grain sizes will enable wider slit openings.

The air supply tube 108 will be connected through a hose 128 to an air pump (not shown). Air passing down the air supply tube 108 will exit at 129 (FIG. 4) and then rise in the aeration tube 46 in the direction of the arrows, passing through the openings 122 to the water in the upper part of the tank. The rising bubbles entrain liquid and cause it to flow upwardly through the registered slits 62, 72 as indicated by the arrows in FIG. 4.

After a period of use, the aeration tube 46 which is made of clear plastics material will become clouded on the inside surface, by accumulation of algae and other detritus, including materials aspirated from the space 96 below the floor plate. That will automatically be cleared off when the air supply tube is pulled upwardly to service or replace the cartridge 116. Movement of the lower wiper disc 110 up and down, by means of the air supply tube, a few times, will scrub the inside surface clean. If the algae and other material collects more rapidly, or is annoying to the owner, the interior of the aeration tube may be cleaned in this way more often.

For normal aquarium use, accumulated sediment may be removed from the lower space 96 by means of the suction head 40 every two weeks or so. Preferably, at the end of each cleaning operation, the suction head will be left in the "far" position shown in broken lines at the left of FIG. 2 where it will rest until the next cleaning operation. To carry out periodic cleaning, the siphon tube 42 is alternately pushed and pulled to move the suction head back and forth along the tank bottom wall. As a minimum, the head should be moved back and forth twice, through its full range of travel. This effectively loosens the sediment.

The siphon ball 44 will then be lowered well below the level of water in the tank and the siphon action initiated by first squeezing the siphon ball, closing the end of the outlet tube 100 with the operator's forefinger, and releasing the ball to draw water into the suction tube all the way to the ball. This starts siphonic flow to a bucket 130 or other drain. Then, while the water is being siphoned from the space 96, the suction head 40 will be drawn slowly the full length of the tank until about ten per cent of the water in the aquarium has been removed. At this point, the siphon ball end of the hose is raised well above the water level in the aquarium for a few seconds to break the siphon until the water in the siphon tube drains back into the tank.

Makeup water at the desired pH and temperature is then put into the tank to replace that removed. This procedure can be carried out with no trauma or stress to the fish.

The apparatus has unique advantages in spawning applications for both egg-scattering and egg-burying varieties of fish. By positioning the floor plate grid sections in "open" mode as shown in FIGS. 4 and 6, the lower space 96 can function as a reservoir for protecting the egg-scattering variety of spawn from their hungry parents. In this application, the gravel would be omitted. Once the eggs have fallen through the slits 62 and 72, they can be collected and transferred to an incubating tank.

It is possible to raise fish in the same aquarium where the eggs were laid and hatched by carefully adding gravel to the floor plate and siphoning the fertilized eggs through the head 40 into the general swimming area above the floor plate. The parents of course would have to be removed to avoid their eating the young.

The egg-burying variety of fish would require the floor plate grid sections 54,56 to be in "closed" mode as shown in FIG. 4A. No gravel would be used. Instead, a one inch layer of peat moss, Willow moss, Spanish moss, or the like, may be placed on the closed floor plate to simulate the bottom of a river bed in the wild. As soon as spawning is completed, the parents can be removed to provide a safe community tank environment for the hatched fish. Once the fertilized eggs have started to develop, the floor plate sections may be opened (FIGS. 1 and 4) and the eggs collected and harvested in the same manner using the suction head 40 as described above for the egg-scattering types of fish.

The embodiment described and shown to illustrate the present invention has been necessarily specific for purposes of illustration. Alterations, extensions, and modifications would be apparent to those skilled in the art. For example, the terms "aquarium" and "tank" are used in the description and claims without limitation as to any particular size or shape, indoors or outdoors. In fact, the principles of the invention would be of great benefit in large outdoor aquariums and tanks, and even commercial fish raising facilities where indoor or outdoor fish ponds are relatively large. The aim of the appended claims, therefore, is to cover all variations included within the spirit and scope of the invention.

The embodiments of the invention in which an exclusive property or privilege is claimed are defined as follows:

1. An aquarium cleaning system comprising:
   a tank having a bottom wall and side and end walls;
   an apertured floor plate disposed above the bottom wall and defining a space between the floor plate and the bottom wall of the tank;
   first guide means extending upwardly from the floor plate;
   a suction head located in said space and being movable therein; and
   a siphon tube extending downwardly in guided relation with the guide means and having the inner end thereof connected to and movable with the suction head.

2. An aquarium cleaning system according to claim 1 including second guide means in said space for guiding said head along a predetermined course.

3. An aquarium cleaning system according to claim 2 in which said second guide means comprises horizontal rod means in said space slidably engaged with said suction head.

4. An aquarium cleaning system according to claim 1 in which said first guide means is an upstanding rigid tube extending through the floor plate.

5. Aquarium cleaning apparatus for use with a rectangular fish tank comprising:
   a rectangular frame having side and end walls sized to fit snugly in the lower portion of a fish tank;
   an apertured floor plate means along the top of the frame and defining a space within the frame beneath the floor plate;
   first guide means extending upwardly from the frame;
   a suction head located in the space beneath the floor plate within the frame and being movable therein; and
   a siphon tube extending downwardly in guided relation with the guide means and having an inner end thereof connected to and movable with the suction head to draw water from the space beneath the floor plate when suction is applied to the siphon tube.

6. An aquarium cleaning apparatus according to claim 5 including second guide means within said frame for guiding said head for movement within the frame.

7. Aquarium cleaning apparatus according to claim 6 in which said second guide means comprises horizontal rod means in the space extending between opposite walls of the frame.

8. Aquarium cleaning apparatus according to claim 5 in which said first guide means is an upstanding rigid tube secured to the frame and extending above the floor plate.

9. Aquarium cleaning apparatus according to claim 5 in which the apertured floor plate means includes a plurality of apertures and means for varying the size of the apertures.

10. Aquarium cleaning apparatus according to claim 5 in which the apertured floor plate means comprises an upper apertured plate section and a lower apertured plate section, and means for adjustably moving one of said sections relative to the other section to vary the degree of registration of the apertures in the respective sections.

11. Aquarium cleaning apparatus according to claim 10 in which the upper apertured section is stationarily mounted on the frame, and the lower apertured section is movably mounted on the underside of the upper apertured section for relative adjustable movement.

12. Aquarium cleaning apparatus according to claim 10 in which each of the upper and lower apertured plate sections comprises a grid of horizontally spaced slats with slits therebetween, and one of said sections is movable relative to the other in a direction to vary the degree of registration of the slits in the two sections.

13. Aquarium cleaning apparatus according to claim 10 in which the means for adjustably moving one of the sections relative to the other section comprises a movable element engaging both sections and actuating means connected to said movable element and extending upwardly from the apertured floor plate means and effective when activated to move said movable element.

14. Aquarium cleaning apparatus according to claim 10 in which the means for adjustably moving one of the sections relative to the other comprises a movable element connected to one of said apertured plate sections.

15. Aquarium cleaning apparatus according to claim 14 in which the movable element is connected to the lower apertured plate section and extends through an aperture in said upper apertured plate section to move said lower plate section independently of said upper plate section.

16. Aquarium cleaning apparatus according to claim 5 including:
an opening in said apertured floor plate means communicating with the space below the plate;
an aeration tube having an upwardly open end portion upstanding from the floor plate means and communicating with said opening;
an air supply tube extending into the upwardly open end portion of the aeration tube and downwardly therein; and
an apertured wiper disk secured to the end portion of said air supply tube and movable up and down therein, said wiper disc having an external wiping edge engageable with the inner wall of said aeration tube;
whereby up and down movement of the apertured wiper disc with the air supply tube is effective to clear the inner surface of accumulated algae and detritus.

17. Aquarium cleaning apparatus according to claim 5 including:
an opening in said apertured floor plate means communicating with the space below the plate;
an aeration tube having an upwardly open end portion and upstanding from the apertured floor plate means and communicating with said opening;
an air supply tube extending through the upwardly open end portion of the aeration tube and downwardly therein;
a cylindrical cartridge carried by said air supply tube and reciprocably slidably mounted within said aeration tube, and having a chamber adapted to contain a filter medium therein, aperture means in opposite ends of said cartridge enabling fluid flowing in said aeration tube to flow into one end of the cartridge, through the filter medium, and out the other end of the cartridge; and
at least one wiper element carried by the cartridge engageable with the inner wall of the aeration tube;
whereby up and down movement of the cartridge and wiper element with the air supply tube is effective to clear the inner surface of the aeration tube of algae and detritus.

18. Aquarium cleaning apparatus according to claim 17 including apertured wiper disc means secured to the end of the air supply tube below said cylindrical cartridge and being engageable with the inner wall of the aeration tube effective to clear the inner surface of the air supply tube in response to up and down movement of the apertured wiper disc means with the air supply tube.

19. Aquarium cleaning apparatus comprising:
apertured floor plate means adapted to be mounted in an aquarium in a position spaced above the bottom wall thereof to support gravel in upwardly spaced relation to said bottom wall;
said apertured floor plate means including an upper apertured plate section and a lower apertured plate section, said sections having registerable apertures; and
one of said sections being adjustably movable relative to the other section to vary the degree of registration of the apertures in the respective sections.

20. Aquarium cleaning apparatus according to claim 19 in which the upper apertured section is stationary and the lower apertured section is telescopically slidably mounted on the underside of the upper apertured section for relative adjustable movement.

21. Aquarium cleaning apparatus according to claim 19 in which each of the upper and lower apertured plate sections comprises a grid of horizontally spaced slats with slits therebetween, and one of said sections is movable relative to the other in a direction to vary the degree of registration of the slits in one section relative to the slits in the other section.

22. Aquarium cleaning apparatus comprising:
an aeration tube adapted to be mounted upright in an aquarium, said aeration tube having an upwardly open end portion;
an air supply tube extending into the upwardly open end portion of the aeration tube and downwardly therein; and
an apertured wiper disc secured to the end portion of the air supply tube and movable up and down therein, said wiper disc having an external wiping edge engageable with the inner wall of the aeration tube;
whereby up and down movement of the apertured wiper disc with the air supply tube is effective to clear the inner surface of algae and detritus.

23. Aquarium cleaning apparatus comprising:
an aeration tube adapted to be mounted upright in an aquarium, said aeration tube having an upwardly open end portion;

an air supply tube extending through the upwardly open end portion of the aeration tube and downwardly therein;

a cylindrical cartridge carried by said air supply tube reciprocably slidably mounted within said aeration tube, and having a chamber adapted to contain a filter medium therein, aperture means in opposite ends of said cartridge enabling fluid flowing in said aeration tube to flow into one end of the cartridge through the filter medium and out the other end of the cartridge; and at least one wiper element carried by the cartridge engageable with the inner wall of the aeration tube;

whereby up and down movement of the cartridge and wiper element with the air supply tube is effective to clear the inner surface of the aeration tube of algae and detritus.

24. Aquarium cleaning apparatus according to claim 23 including apertured wiper disc means secured to the end of the air supply tube below said cylindrical cartridge and being engageable with the inner wall of the aeration tube effective to clear the inner surface of the air supply tube in response to up and down movement of the apertured wiper disc means with the air supply tube.

* * * * *